(12) United States Patent
Choi

(10) Patent No.: US 11,054,137 B2
(45) Date of Patent: Jul. 6, 2021

(54) CO-AXIAL DUAL SWIRLER NOZZLE

(71) Applicant: DOOSAN HEAVY INDUSTRIES & CONSTRUCTION CO., LTD., Changwon-si (KR)

(72) Inventor: Jung Jin Choi, Changwon-si (KR)

(*) Notice: Subject to any disclaimer, the term of this patent is extended or adjusted under 35 U.S.C. 154(b) by 164 days.

(21) Appl. No.: 16/041,826

(22) Filed: Jul. 22, 2018

(65) Prior Publication Data

US 2019/0137103 A1    May 9, 2019

Related U.S. Application Data

(60) Provisional application No. 62/582,228, filed on Nov. 6, 2017.

(51) Int. Cl.
| | | |
|---|---|---|
| *F23R 3/14* | (2006.01) | |
| *F02C 3/14* | (2006.01) | |
| *F23R 3/28* | (2006.01) | |
| *F23R 3/16* | (2006.01) | |

(52) U.S. Cl.
CPC .............. *F23R 3/14* (2013.01); *F02C 3/14* (2013.01); *F23R 3/16* (2013.01); *F23R 3/286* (2013.01); *F05D 2240/35* (2013.01)

(58) Field of Classification Search
CPC ...... F23D 11/103; F23D 11/107; F23D 11/12; F23D 14/70; F23R 3/14; F23R 3/16; F23R 3/286; F23R 3/24; F23R 2900/03343
See application file for complete search history.

(56) References Cited

U.S. PATENT DOCUMENTS

| | | | | |
|---|---|---|---|---|
| 2002/0011064 A1* | 1/2002 | Crocker | ............... | F02C 7/22 60/776 |
| 2006/0248898 A1* | 11/2006 | Buelow | ............... | F23R 3/28 60/776 |
| 2008/0280238 A1* | 11/2008 | Smith | ............... | F23R 3/14 431/9 |
| 2013/0019602 A1* | 1/2013 | Kim | ............... | F23R 3/10 60/725 |
| 2014/0165530 A1* | 6/2014 | Stutz | ............... | F01D 25/18 60/39.08 |
| 2016/0040881 A1* | 2/2016 | Cunha | ............... | F23R 3/06 60/748 |
| 2017/0176000 A1* | 6/2017 | Shershnyov | ............... | F23D 11/16 |

FOREIGN PATENT DOCUMENTS

| | | |
|---|---|---|
| CN | 103939943 A | 7/2014 |
| JP | 2002-364849 A | 12/2002 |
| JP | 2004-085123 A | 3/2004 |

* cited by examiner

*Primary Examiner* — Scott J Walthour

(57) ABSTRACT

Provided is a combustion nozzle including a center cylinder having a cylinder shape, a middle cylinder coaxially disposed with the center cylinder and surrounding the center cylinder, an outer cylinder coaxially disposed with the middle cylinder and surrounding the middle cylinder, and a perforated plate disposed inside the center cylinder to create turbulent flow therethrough. In addition, the combustion nozzle further includes inner vanes disposed between the center cylinder and the middle cylinder and outer vanes disposed between the middle cylinder and the outer cylinder.

21 Claims, 18 Drawing Sheets

SL: laminar flame speed

SL: laminar flame speed

SL: laminar flame speed

CO-AXIAL DUAL SWIRLER NOZZLE

CROSS-REFERENCE TO RELATED APPLICATION(S)

This application claims priority to U.S. Provisional Application Ser. No. 62/582,228, filed on Nov. 6, 2017, the entire contents of which are incorporated by reference herein.

TECHNICAL FIELD

Exemplary embodiments of the present invention relate to a combustion nozzle of a gas turbine, and more particularly, to a combustion nozzle of a gas turbine having coaxial dual swirlers to improve an operating envelop for stable flame by improving fuel-air mixing through a shear-mixing layer between flows through the dual swirlers.

BACKGROUND

A turbine is a mechanical device that obtains rotational force by impulsive force or reaction force by using a flow of compressible fluid, such as steam or gas, and includes a steam turbine using steam, a gas turbine using high-temperature combustion gas, or the like.

The gas turbine is a rotary power engine that extracts energy from the flow of the combustion gas. The gas turbine includes a compressor, a turbine, and a combustion chamber. The compressed air pressurized by the compressor is mixed with fuel and then the mixture is combusted, such that high-temperature high-pressure combustion gas expands, and the turbine is driven by this expansion force. Energy is transferred through a shaft as torque, or is obtained in the form of thrust or compressed air. This energy can be used to drive an aircraft, a generator, and so on.

The compressor is provided with an air inlet through which air is supplied to the compressor, and a plurality of compressor vanes and blades are disposed alternately in the compressor housing. The combustor supplies fuel to the compressed air compressed by the compressor and ignites it with a burner to generate high-temperature high-pressure combustion gas.

A plurality of turbine vanes and turbine blades are disposed alternately in a housing of the turbine. Further, a rotor penetrating a center of the compressor, combustor, turbine and an exhaust is also provided therein.

Both ends of the rotor are rotatably supported by bearings. A plurality of disks are fixed to the rotor and the blades are connected to the rotor. Simultaneously, a drive shaft of, e.g., a generator is connected to an end of an exhaust chamber.

Since the gas turbine does not have a reciprocating mechanism such as a piston of a four-stroke engine, consumption of lubricating oil is extremely low due to the absence of a mutual friction part such as a piston-cylinder. The gas turbine is also advantageous in that the amplitude, which is a characteristic of reciprocating machines, is greatly reduced, thereby permitting high-speed rotational motion.

The thermodynamic cycle of a gas turbine ideally follows a Brayton cycle. The Brayton cycle consists of four phases including isentropic compression (adiabatic compression), static pressure heating, isentropic expansion (adiabatic expansion), and static pressure heat discharge. After sucking the atmospheric air and compressing it to a high-pressure, a fuel is combusted in a static pressure environment to release heat energy. A high-temperature combustion gas is then expanded and transformed into kinetic energy, and an exhaust gas containing residual energy is discharged into the atmosphere. Likewise, the Brayton cycle consists of four processes, i.e., compression, heating, expansion, and heat discharge.

The operation of the gas turbine is briefly described. Air compressed in the compressor is mixed with the fuel and combusted to generate high-temperature combustion gas, and the combustion gas generated is injected into the turbine blades. The injected combustion gas passes through the turbine vanes and blades and generates rotational force in the turbine blades, which eventually rotates the rotor coupled to the turbine blades.

The combustion gas with a high-pressure and high-temperature burned inside the combustion liner is transferred to the turbine through the transition piece. In order to improve gas turbine efficiency, it is necessary to increase fuel efficiency by effectively mixing fuel with compressed gas.

Common fuel nozzle design in a low emission gas turbine combustor utilizes high swirling flows to create a strong recirculation zone downstream of the nozzle tip to stabilize premixed flames. Recently, low swirl nozzle with a center flow passage has been developed that utilizes low swirling diverging flows to stabilize premixed flame with low nitrogen oxide (NOx) without a strong recirculation zone. In particular, a low swirl nozzle for premixed low NOx combustion requires complete fuel/air mixing to meet the premixed condition and the diverging flow should match a premixed flame speed for stable flame without a strong recirculation zone.

The flame speed changes significantly over the wide range of operating conditions of pressure, fuel temperature, and/or equivalence ratio. The ratio of flow speeds through center passage and outer passage (Uc/U) needs to be controlled to adjust effective swirl levels for diverging flows to match the flame speed at different operating conditions. For a fixed vane angle and a fixed radius ratio (Rh/R) in the low swirl nozzle, the flow velocity ratio Uc/U needs to be changed in a wide range for the appropriate swirl number for diverging flow to match the flame speed at different operating conditions.

Therefore, for low swirl nozzle, it has been noted that the operating envelop for industrial gas turbine combustor is limited and a wide range in flow control for stable flame is needed. No existing technology improves the performance of the low swirl nozzle for wide range of operating conditions in industrial gas turbine applications.

SUMMARY

The exemplary embodiments of the present invention allow a narrow range of flow control parameters for a wide range of operating conditions in an industrial gas turbine combustor and provide better fuel/air mixing. This is achieved by improving flow characteristics of the conventional low swirl nozzle by a novel dual swirler design. Accordingly, the operating envelop for the stable flame and low nitrogen oxide can be substantially improved due to the coaxial dual swirler as disclosed herein and fuel/air mixing is improved through the shear/mixing layer generated by between flows through these swirlers.

The importance of the present invention is apparent as a robust combustor with solid stable combustion and low emission over a wide range of operating conditions is needed for industrial gas turbines used around the world while a new type of combustor that is competent with industrial gas turbines from different companies is needed.

The present invention provides a combustion nozzle, which includes a center cylinder having a cylinder shape, a middle cylinder coaxially disposed with the center cylinder and surrounding the center cylinder, an outer cylinder coaxially disposed with the middle cylinder and surrounding the middle cylinder, and a perforated plate disposed inside the center cylinder to create turbulent flow therethrough. In addition, the combustion nozzle further includes inner vanes disposed between the center cylinder and the middle cylinder and outer vanes disposed between the middle cylinder and the outer cylinder.

The combustion nozzle according to an embodiment of the present invention may also be provided with a cone-shaped diverging nozzle tip attached to the outer cylinder to create a diverging flow downstream of the nozzle to improve fuel and air mixing efficiency.

A vane angle of the inner vanes and the outer vanes may be defined as a degree in which a vane is inclined from a leading edge thereof with respect to the cylinder axis of the center cylinder, a product of an angle of the inner vanes and an angle of the outer vanes may be a negative value or a positive value.

The inner vanes may be spaced apart from each other with a uniform distance along a circumferential direction of the center cylinder, and the outer vanes are spaced apart from each other with a uniform distance along a circumferential direction of the middle cylinder.

In addition, a cylinder radius of the middle cylinder (Rm) is defined by Formula showing below.

$$Rm = Rh + \beta \times (R0 - Rh)$$

Where $\beta$ has a value from 0.1 to 0.9, Rh is a radius of the center cylinder, and R0 is a radius of the outer cylinder.

In addition, Uc is defined as a flow velocity of a fluid passing through the center cylinder and U is defined as a flow velocity of a fluid passing through the middle cylinder and the outer cylinder, the ratio of Uc to U has a value of 0.4 to 0.6. Also, a length of the middle cylinder along an axial direction is equal to or greater than a length of the center cylinder along an axial direction.

The perforated plate has a plurality of flow holes to create turbulent flow, and when a hole area ratio of the perforated plate is defined as a ratio of an area of the plurality of holes to an area of the perforated plate, the hole area ratio has a value of 60% to 80%.

BRIEF DESCRIPTION OF THE DRAWINGS

These and/or other aspects, features, and advantages of the present disclosure will become apparent and more readily appreciated from the following description of exemplary embodiments, taken in conjunction with the accompanying drawings of which.

DETAILED DESCRIPTION OF THE DISCLOSURE

Figure 1:
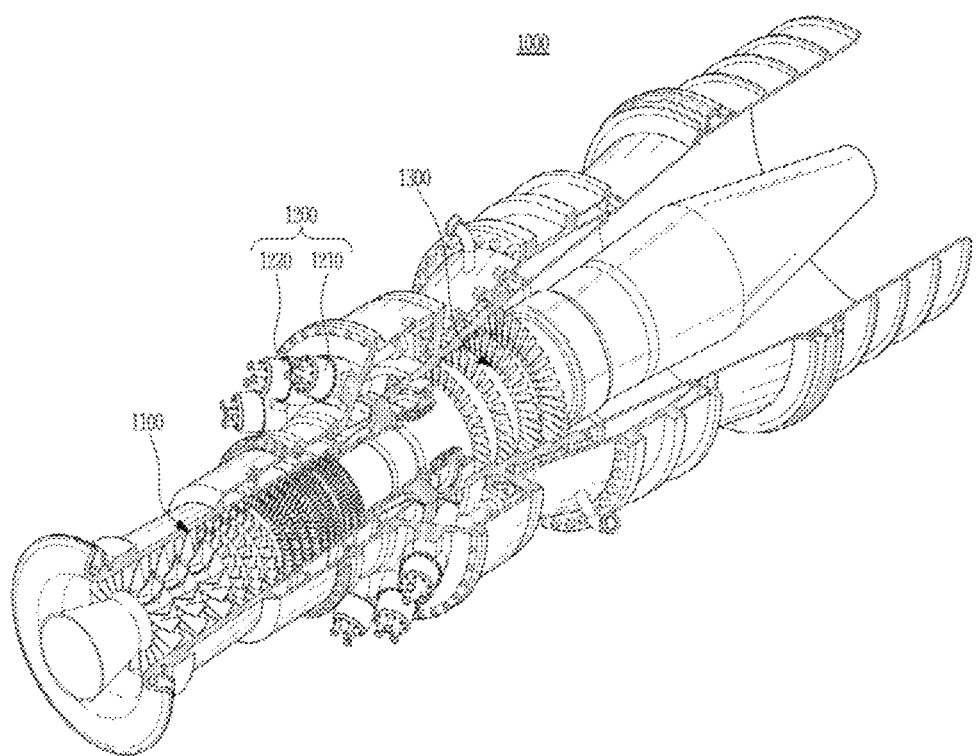
FIG. 1 is a view illustrating an overall structure of a gas turbine according to an embodiment of the present invention.

Hereinafter, exemplary embodiments will be described in greater detail with reference to the accompanying drawings. Regarding the reference numerals assigned to the elements in the drawings, it should be noted that the same elements will be specified by the same reference numerals, wherever possible, even though they are shown in different drawings. Also, in the description of exemplary embodiments, detailed description of well-known related structures or functions will be omitted when it is deemed that such description will cause ambiguous interpretation of the present disclosure.

It should be understood, however, that there is no intent to limit this disclosure to the particular exemplary embodiments disclosed. On the contrary, exemplary embodiments are to cover all modifications, equivalents, and alternatives falling within the scope of the exemplary embodiments. Like numbers refer to like elements throughout the description of the figures.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected," "coupled," or "joined" to another component, a third component may be "connected," "coupled," and "joined" between the first and second components, although the first component may be directly connected, coupled or joined to the second component.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, exemplary embodiments will be described in detail with reference to the accompanying drawings. The configuration and effects thereof can be clearly understood from the following description.

Figure 2:
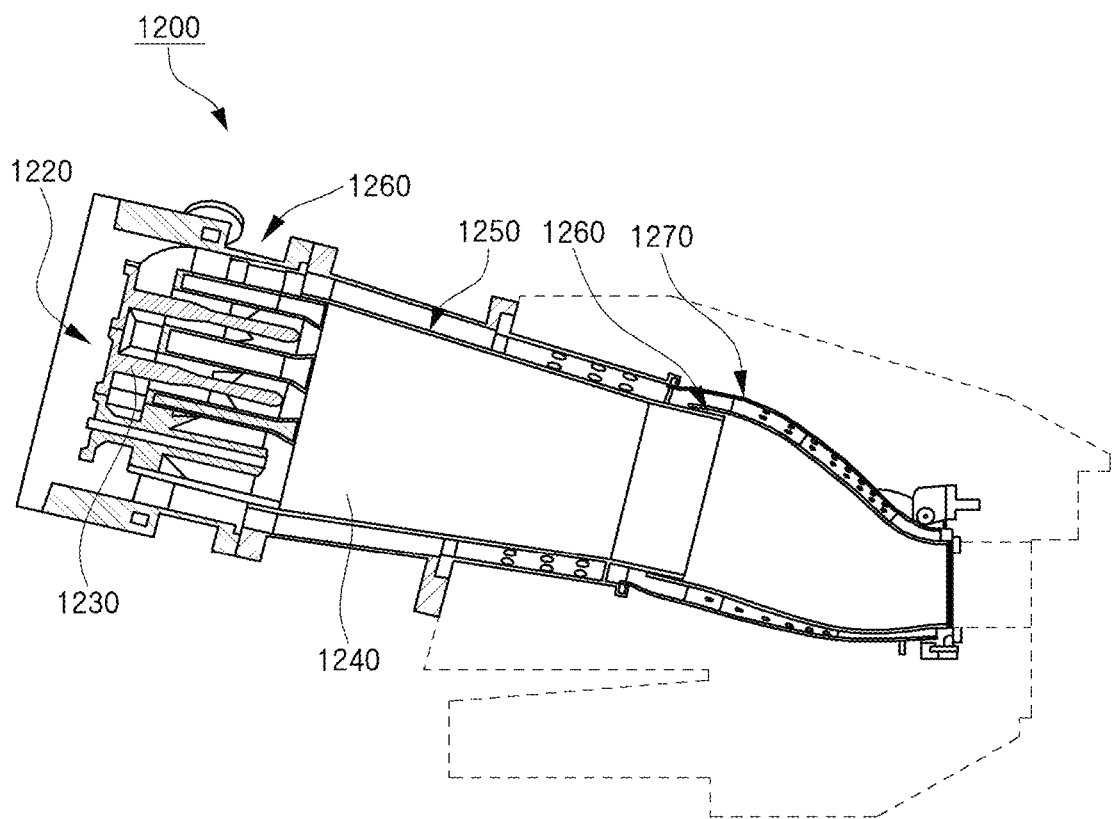
FIG. 2 is a view illustrating a combustor of a gas turbine according to an embodiment of the present invention.
Figure 3:
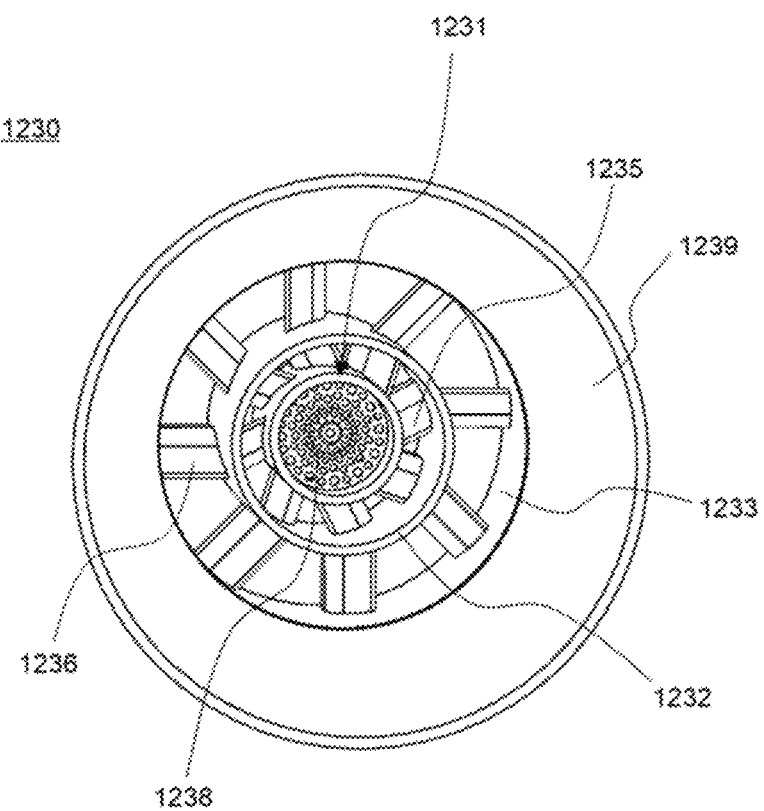
FIG. 3 is a view illustrating a combustion nozzle according to an embodiment of the present invention having a middle cylinder between a center cylinder and an outer cylinder.
Figure 4:
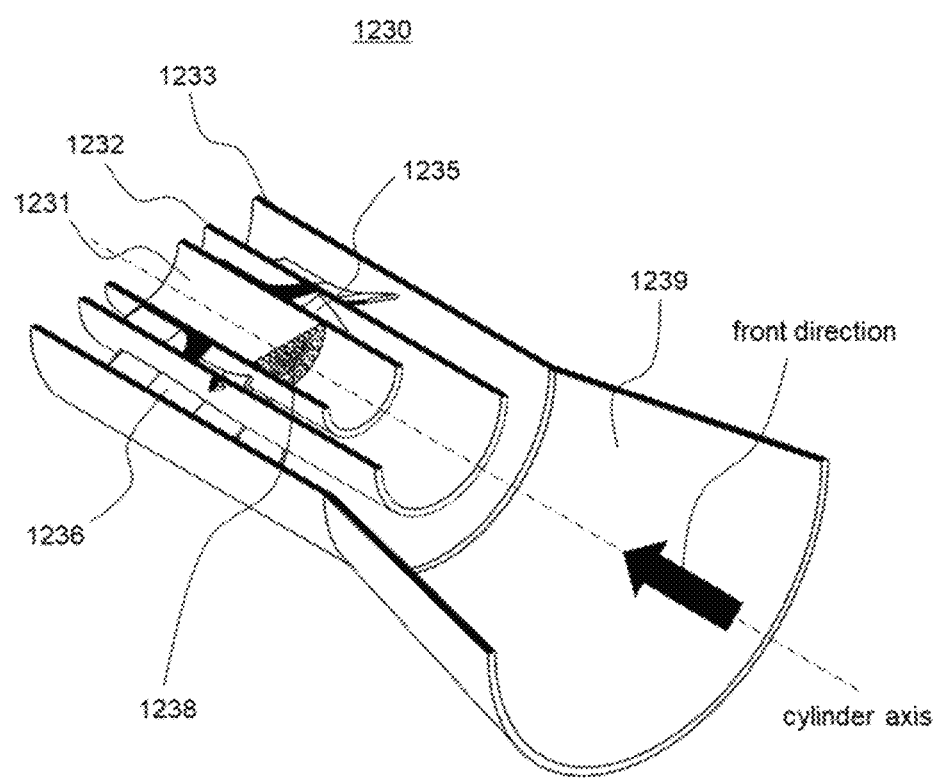
FIG. 4 is a cross-sectional perspective view illustrating a combustion nozzle according to an embodiment of the present invention having a middle cylinder between a center cylinder and an outer cylinder.

FIG. 1 is a view schematically illustrating the overall configuration of a gas turbine 1000, and FIG. 2 illustrates an exemplary combustor 1200. FIGS. 3 and 4 are views illustrating a combustion nozzle according to an embodiment of the present invention having a middle cylinder between a center cylinder and an outer cylinder.

A gas turbine 1000 running on a Brayton cycle includes a compressor, a combustor, and a turbine 1300. FIG. 1 is a view schematically illustrating the overall configuration of a gas turbine 1000. Although the following description is based on the exemplary gas turbine of FIG. 1, it is not limited to the gas turbine 1000 as illustrated in FIG. 1 but may be applied to other gas turbine engines having equivalent configurations.

The compressor 1100 serves to suck and compress the air. The compressor 1100 supplies air that has been compressed to the combustor 1200 while supplying the compressed air to a high-temperature region of the gas turbine 1000 to cool the high-temperature region in the gas turbine 1000. Since the sucked air is subject to an adiabatic compression process in the compressor, the pressure and temperature of the air passing through the compressor 1100 are increased.

The compressor 1100 included in the gas turbine 1000 is usually designed as a centrifugal compressor 1100 or an axial compressor. In general, the centrifugal compressor 1100 is applied in a small gas turbine 1000, whereas a multi-stage axial compressor 1100 is used for a large gas turbine 1000, such as the gas turbine 1000 as shown in FIG. 1, due to a large amount of air compression. Referring to FIG. 1, a rotating shaft of a compressor 1100 and a rotating shaft of a turbine 1300 are connected to each other because the compressor 1100 is driven by using a portion of power output from the turbine 1300.

The compressor 1100 is driven using a portion of power output from the turbine 1300. To this end, a rotary shaft of the compressor 1100 and a rotary shaft of the turbine 1300 are directly coupled to each other. In the case of the large gas turbine 1000, approximately half of the power produced by the turbine 1300 is consumed to drive the compressor. Therefore, the improvement in the efficiency of the compressor 1100 has a great influence on the overall efficiency of the gas turbine 1000.

The combustor 1200 mixes the compressed air supplied from an exit of the compressor 1100 with the fuel and combusts the mixture at a constant pressure to produce a high energy combustion gas. FIG. 2 illustrates the exemplary combustor 1200. The combustor 1200 is disposed downstream of the compressor, and a plurality of burners 1220 are disposed along an annular casing 1210 of the combustor. Each burner 1220 is provided with several combustion nozzles 1230 and fuels injected from the combustion nozzles 1230 are mixed with the air at a predetermined ratio to make the mixture that is suitable for combustion.

Gas fuels and liquid fuels, or composite fuels combining them may be used in the gas turbine 1000. The amount of emission of carbon monoxide or nitrogen oxide generated from the combustion of the gas turbine is subject to strict regulatory restrictions.

Due to the a high-temperature environment in the combustor 1200, it is necessary to adequately cool the combustor 1200, which may be achieved by allowing the compressed air to flow along an outer surface of a duct assembly connecting a burner 1220 and a turbine 1300, through which a high-temperature combustion gas flows. The duct assembly according to an embodiment of the present invention may include a combustion liner 1250, a transition piece 1260, and a flow sleeve 1270. The compressed air may be driven toward the combustion nozzle 1230. In this process, the duct assembly heated by the high-temperature combustion gas can be properly cooled.

The duct assembly may include a dual structure in which the flow sleeve 1270 surrounds an outer surface of the liner 1250 and transition piece 1260, which are coupled through an elastic support means 1280. The compressed air penetrates into the annular space inside the flow sleeve 1270 to thus cool the liner 1250 and transition piece 1260.

Here, since an end of the liner 1250 and the transition piece 1260 is secured to the combustor 1200 and the turbine 1300, respectively, the elastic support means 1280 has to be capable of supporting the liner 1250 and transition piece 1260 in a structure capable of accommodating a length and diameter elongation due to thermal expansion.

A high-temperature and high-pressure combustion gas produced in the combustor 1200 are supplied to the turbine 1300 through the duct assembly. In the turbine 1300, the thermal energy of the combustion gas is transformed into mechanical energy to rotate the rotating shaft by applying the collision and reaction force to a plurality of turbine blades radially disposed on the rotary shaft of the turbine 1300, resulting from the adiabatic expansion of the combustion gas. Some of the mechanical energy obtained from the turbine 1300 is supplied as the energy required to compress air in the compressor, while the remainder is used as effective energy to produce electric power by driving a generator.

As aforementioned, the major components of the gas turbine 1000 do not reciprocate and the gas turbine rarely consumes lubricating oil due to the absence of a mutual friction part, such as a piston-cylinder. The gas turbine 1000 is also advantageous in that the vibration amplitude which is an intrinsic characteristic of reciprocating machines is greatly reduced, thereby making a high-speed motion possible.

The efficiency of the gas turbine is dependent on several factors. Because the thermal energy of the combustion gas generates mechanical energy in the turbine 1300, rotating the turbine and shaft coupled to the turbine, it is important to prevent the combustion gas from leaking through the gaps in the turbine or combustor, e.g., between the combustion liner 1250 and the transition piece 1260 or between the turbine blade segments, to improve the gas turbine efficiency.

The efficiency of the gas turbine can also be enhanced by optimizing the combustion process at the combustor 1200. The combustor 1200 mixes the compressed air with the fuel and the mixture is ignited at a constant pressure to produce a high energy combustion gas. Hence, the gas turbine efficiency may be further increased by increasing air-fuel mixing efficiency.

The air-fuel mixing is also associated with the emission of carbon monoxide or nitrogen oxide. As stated above, the amount of emission of carbon monoxide or nitrogen oxide resulting from the combustion is subject to a strict regulatory restriction. It is important to create a combustion environment to reduce the amount of carbon monoxide or nitrogen oxide. Despite the difficulties of controlling the combustion process, it may be helpful to maintain a uniform combustion temperature inside the combustion chamber because the uniform combustion temperature inside the combustion chamber is capable of contributing to reducing the nitrogen oxide generation, caused by the sudden increase in the temperature at a certain position inside the combustion chamber. In recent years, therefore a premix combustion has been used for the combustor of the gas turbine in order to control the nitrogen oxide generation.

In the case of the premix combustion, the compressed air is mixed with the fuel, and then the mixture is injected to the combustion chamber through the combustion nozzle 1230. The initial ignition of the premixed gas is made using an igniter. Once the combustion is stabilized after the ignition, the combustion is maintained by supplying the fuel and air.

In addition, a swirler may be installed in the combustion nozzle 1230 to promote the premixing of air and fuel. The swirler is used as a flame stabilizer for pressure spray oil burners or high-pressure air spraying oil burners. The swirler is swirling the air using a swirling vane and forms a low-speed, high-temperature circulation zone which is ignitable by making a central portion at a negative pressure. Such a swirler is classified into an axial-flow type, a radial-flow type, and a combination type.

FIG. 3 is a view illustrating a combustion nozzle 1230 according to an embodiment of the present invention and FIG. 4 is a cross-sectional perspective view of the combustion nozzle 1230. As shown in FIGS. 3 and 4, the combustion nozzle 1230 according to an embodiment of the present invention includes a center cylinder 1231 in which fuel, air, or a premixed gas is injected, a middle cylinder 1232 coaxially disposed with the center cylinder and surrounding the center cylinder 1231, an outer cylinder 1233 coaxially disposed with the middle cylinder 1232 and surrounding the middle cylinder 1232.

The center cylinder 1231, the middle cylinder 1232, and the outer cylinder 1233 have a cylinder shape formed around a same rotation axis. The center cylinder 1231 is accommodated in the middle cylinder 1232 and the middle cylinder 1232 is accommodated by the outer cylinder 1233. The inner vanes 1235 may be spaced apart from each other with a uniform distance along a circumferential direction of the center cylinder, and the outer vanes 1236 may be spaced apart from each other with a uniform distance along a circumferential direction of the middle cylinder.

The combustion nozzle 1230 may further include inner vanes 1235 disposed between the center cylinder 1231 and the middle cylinder 1232 to swirl a flow of fuel or air passing therethrough, and outer vanes 1236 disposed between the middle cylinder 1232 and the outer cylinder 1233 to swirl a flow of fuel or air flowing through the space between the middle cylinder 1232 and the outer cylinder 1233. The combustion nozzle 1230 according to an embodiment of the present invention may also include a cone-shaped diverging nozzle tip 1239 attached to the outer cylinder 1233 to create a diverging flow of fuel, air, or premixed gas. The cone-shaped diverging nozzle tip 1239 has a diameter diverging along downstream.

In addition, the combustion nozzle 1230 according to an embodiment of the present invention may further include a perforated plate 1238 installed inside the center cylinder 1231 to create a turbulent flow of fuel, air, or premixed gas flowing through the center cylinder 1231.

Figure 5:
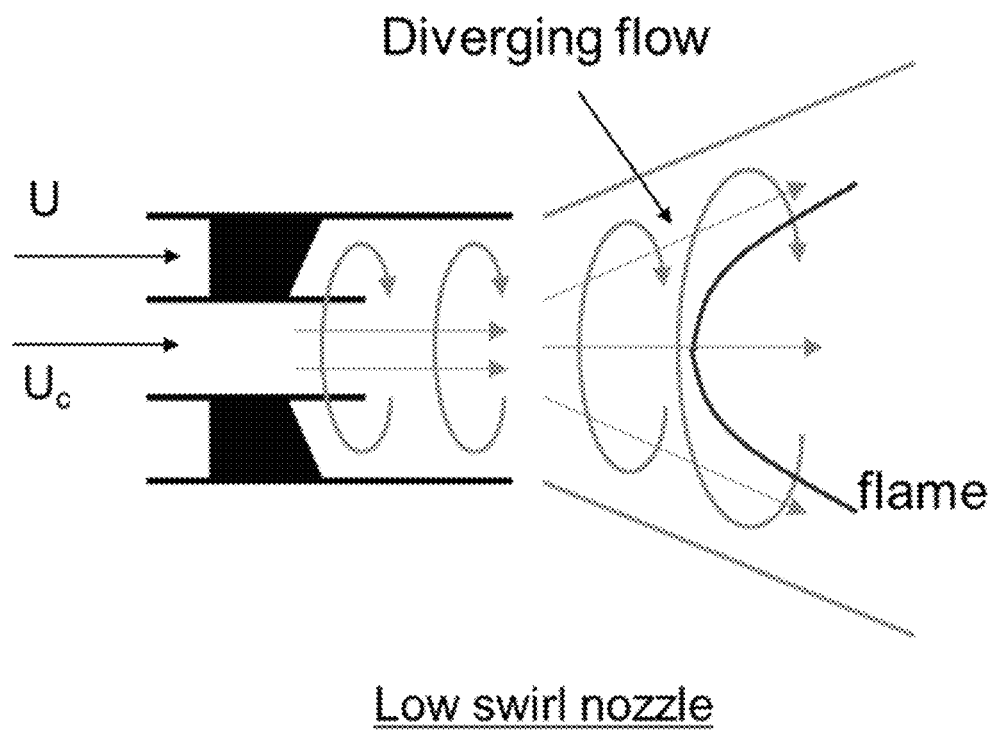
FIG. 5 is a diagram illustrating a conventional low swirl nozzle surrounded by an outer swirler.

As shown in FIG. 5, a conventional low swirl nozzle is provided a center passage cylinder 1231 which is surrounded by an outer cylinder 1233. Thus, two separate fuel spaying regions may be partitioned. Also, the conventional low swirl nozzle is surrounded by an outer swirler to control the swirl number within a wide range of Uc/U for a fixed vane angle and radius ratio (Rh/R), where Uc is the flow velocity through a center passage cylinder and U is the flow velocity through the outer cylinder with vanes. The center passage cylinder has a radius of Rh, and the outer cylinder passage has a radius of R. The diverging flow generated is intended to provide a stable flame.

Figure 6:
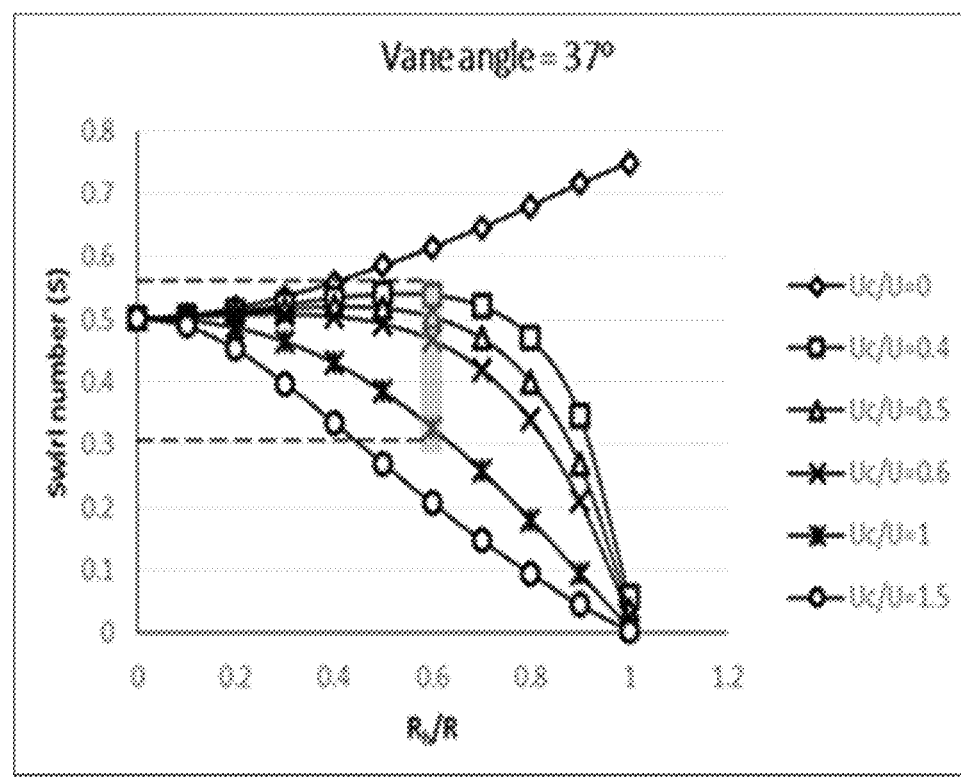
FIG. 6 is a graph illustrating generated swirl numbers (S) as a function of radius ratio (Rh/R) at different ratios of velocities (Uc/U) through a center passage cylinder and outer passage cylinder with vanes of the conventional a low swirl nozzle of FIG. 5.

In the graph of FIG. 6, the effective swirl number (S) is shown as a function of the ratio of inner and outer radii (Rh/R) at different flow speed ratios (Uc/U) of flows through the center passage cylinder and the outer passage cylinder. As shown in FIG. 6, the swirl level is relatively high, which is in the range of 0.46-0.56 for the flow speed ratios (Uc/U) between 0.4 and 0.6.

On the contrary, the combustion nozzle 1230 according to an embodiment of the present invention includes a middle cylinder 1232 disposed between the center passage cylinder 1231 and the outer cylinder 1233, which has a coaxial axis with the center cylinder 1231 or the outer cylinder 1233. Due to the middle cylinder 1232 provided, three separate fuel injection regions (or fuel spaying regions) may be partitioned. In other words, the combustion nozzle 1230 according to an embodiment of the present invention may be partitioned into (1) a space inside the center cylinder 1231, (2) an inner vane flow region between the center cylinder 1231 and the middle cylinder 1232, including the inner vanes 1235 therein, and (3) an outer vane flow region between the middle cylinder 1232 and the outer cylinder 1233, having the outer vanes 1236.

Here, although the partitioned flow regions inside the combustion nozzle 1230 have been described as a "fuel injection region," "fuel spraying region," or a "fuel flow region," it is not intended that only fuel flows through the partitioned regions. Not only fuel, but also air or premixed gas of fuel and air may flow through the partitioned flow regions. In order to increase the combustion efficiency or to suppress the production of nitrogen oxides, various forms of fluid, e.g., fuel, air, or their premixed gas, may flow through the partitioned flow regions. Likewise, while the term "fuel flow" is generally referred to in the description below, it should be construed that various premixed fluids including the fuel may flow therethrough.

The inner vane 1235 and the outer vane 1236 according to an embodiment of the present invention independently control the swirling of the fuel along the inner vane flow region and the outer vane flow region, respectively. In other words, the combustion nozzle 1230 may create a co-axial dual swirl due to the inner vane 1235 and the outer vane

1236. Specifically, a swirling flow through the inner vane flow region and a swirling flow through the outer vane flow region may differ in the direction of swirling, the strength of swirling, or the like.

For example, the inner vane 1235 of the inner vane flow region and the outer vane 1236 of the outer vane flow region may be configured in different directions. Fuel passing through the inner vane flow region may swirl in a clockwise direction by the inner vane 1235, whereas fuel passing through the outer vane flow region may swirl in a counterclockwise direction due to the outer vane 1236. The clockwise direction or counterclockwise direction is intended to describe a flow direction of the fuel, relative to each other, when the combustion nozzle 1230 is viewed from downstream. It does not mean an absolute direction. Therefore, it may be understood that a fuel flow through the inner vane flow region and a fuel flow through the outer vane flow region may be created in an opposite direction. For example, the premixed fuel passing through the inner vane flow region may be created to swirl in a counterclockwise direction while the premixed fuel passing through the outer vane flow region may swirl in a clockwise direction.

Figure 7:
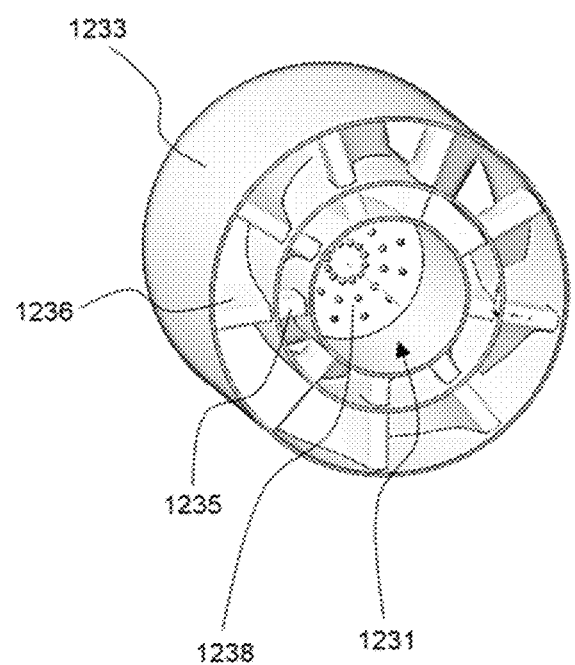
FIG. 7 is a view illustrating a vane angle according to an embodiment of the present invention.

As such, counter current swirling (i.e., counter-swirling) may be created by disposing the inner vane 1235 and the outer vane 1236 in different directions, as shown in FIG. 3. FIG. 7 illustrates an example of a combustion nozzle in which the inner vane 1235 and the outer vane 1236 are provided in different directions so as to create the counter-swirling.

Figure 8:
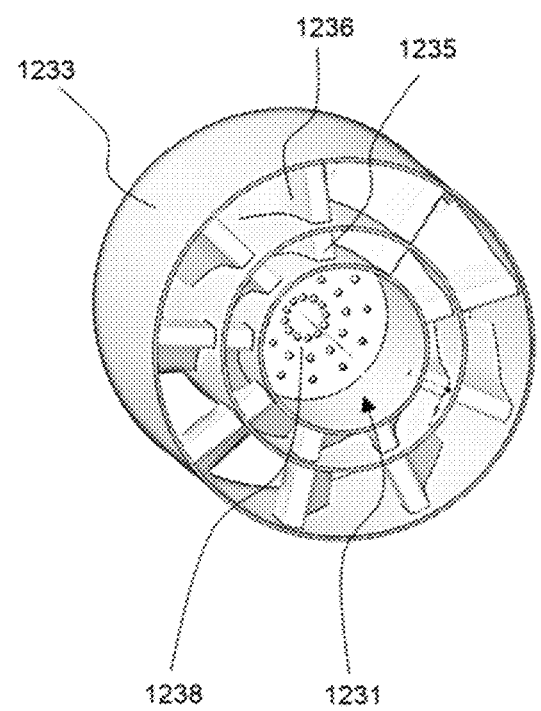
FIG. 8 is a view illustrating an exemplary combustion nozzle having counter-rotating coaxial dual swirlers according to an embodiment of the present invention.

The inner vane 1235 and the outer vane 1236 are not limited to being disposed in opposite directions, but they may be disposed in the same direction so as to achieve more efficient fuel flow and flame propagation. In other words, the inner vane 1235 and the outer vane 1236 may be configured such that a fuel flow passing through the inner vane flow region and a fuel flow passing through the outer vane flow region may swirl in the clockwise direction or in the counterclockwise direction (i.e. co-swirling). FIG. 8 illustrates an example of a combustion nozzle 1230 according to an embodiment of the present invention, in which the inner vane 1235 and the outer vane 1236 are disposed in the same direction to create the co-swirling.

The inner and outer vane angles can be adjusted independently so that the fuel passing through the inner vane flow region and the fuel passing through the outer vane flow region may be swirling independently. The vane angle is a parameter indicating the degree of inclination of the vane with respect to a cylinder axis. For example, when a positive angle is defined as the case where the vane is inclined counterclockwise with respect to the cylinder axis, the degree of inclination of the vane clockwise may be defined as a negative angle.

Figure 9:
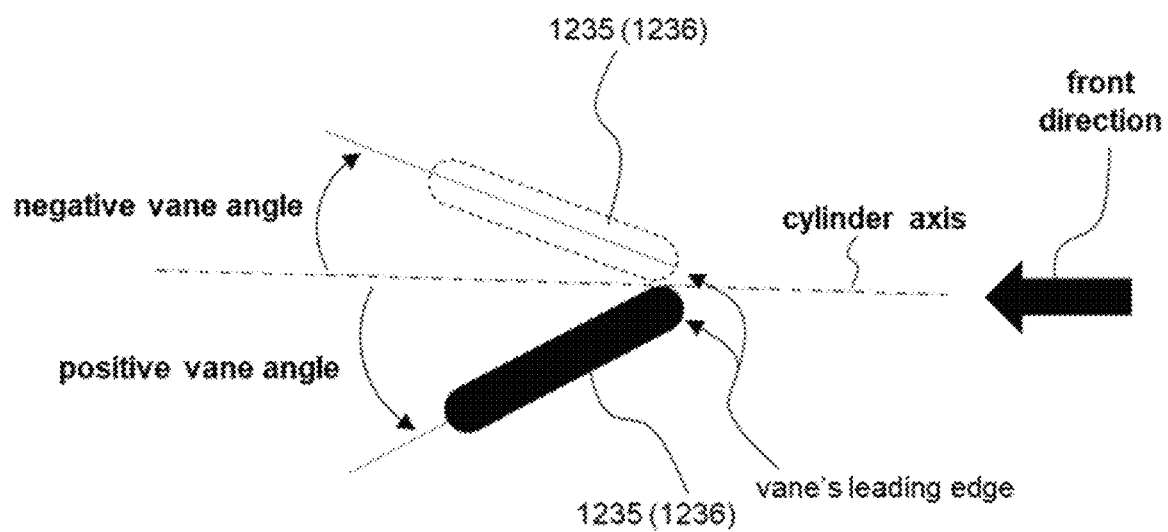
FIG. 9 is a view illustrating an exemplary combustion nozzle having co-rotating coaxial dual swirlers according to an embodiment of the present invention.

More specifically, as shown FIG. 9, a front direction may be defined as a direction when the combustion nozzle 1230 is viewed in a downstream direction with respect to the cylinder axis. The front direction is also illustrated in FIG. 4. A positive vane angle may be defined as a case in which the vane is inclined in one direction from a leading edge of the vane along the front direction with respect to the cylinder axis, and a negative vane angle may be defined as a case in which the vane is inclined in an opposite direction from a leading edge of the vane. Referring to FIG. 9, when the vane is inclined downward along the front direction with respect to the cylinder axis, it may be defined as the positive angle. When the vane is inclined upward along the front direction with respect to the cylinder axis, it may be defined as the negative angle.

The directions of the inner vane 1235 and the outer vane 1236, or the positive and negative vane angles, are parameters that are construed as indicating a relatively inclined direction of the vanes. Therefore, when the inner vane angle and the outer vane angle are both positive or negative, the inner vane 1235 and the outer vane 1236 are disposed in the same direction, whereas when a sign of the inner vane angle and the outer vane angle are different, the inner vane 1235 and the outer vane 1236 are disposed in a different direction. For instance, when a product of the inner vane angle and the outer vane angle is positive, the inner vane 1235 and the outer vane 1236 are disposed in the same direction, whereas a product of the inner vane angle and the outer vane angle is negative, the inner vane 1235 and the outer vane 1236 are disposed in a different or opposite direction.

Figure 10A:
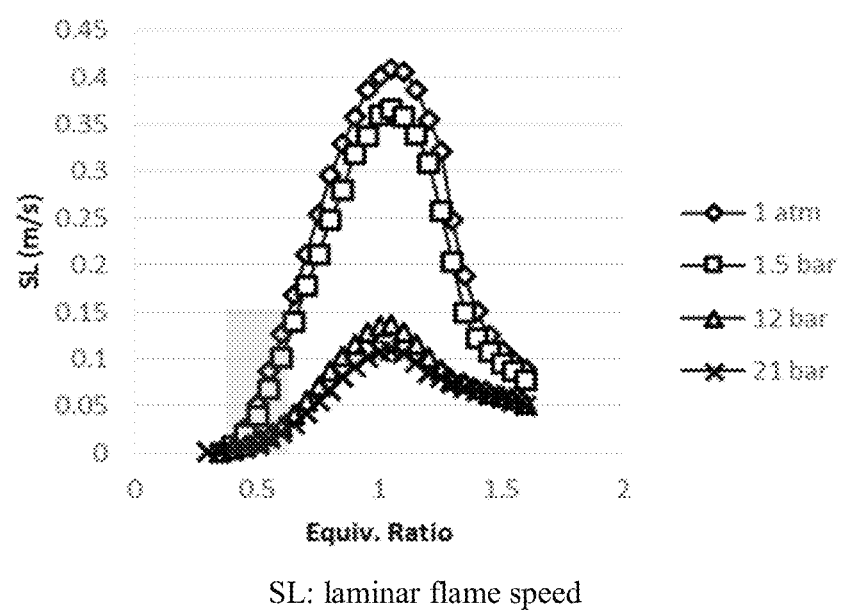
FIGS. 10A to 10C are graphs illustrating a relationship between the laminar flame speed as a function of equivalence ratio for different pressure at specific temperature (T) according to an embodiment of the present invention.
Figure 10B:
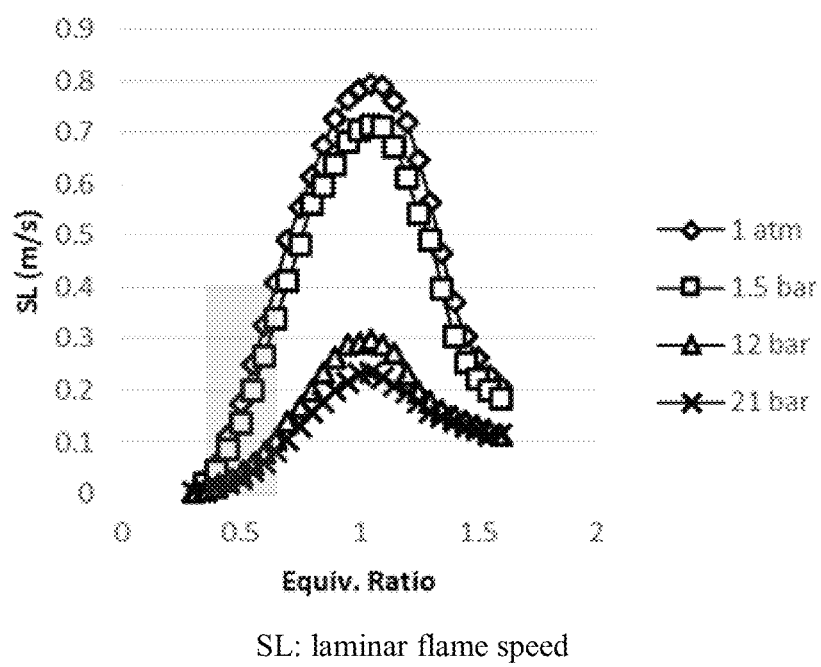
Figure 10C:
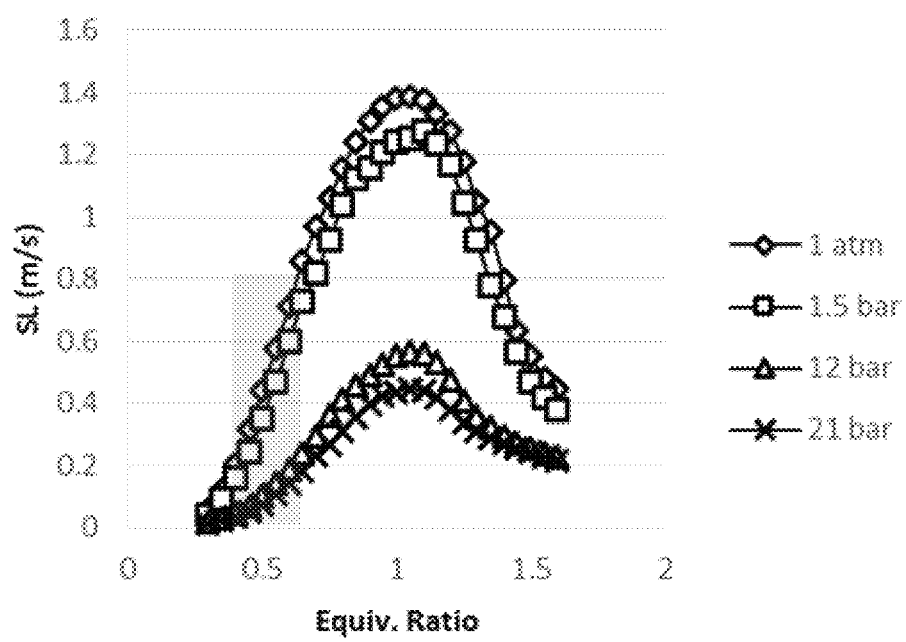

In accordance with the present disclosure, variation of inner and outer vane angles can result in creating co-swirling or counter-swirling flows for better fuel/air mixing and providing the narrow range of Uc/U to control the effective low swirl number for diverging flow to match a flame speed. For example, FIGS. 10A to 10C shows the relationship between the laminar flame speed (SL) and pressure at a specific unburnt fuel/air mixture temperature (T). As shown, the laminar flame speed decreases with the increasing pressure while it increases with the increasing unburnt mixture temperature (T).

Figure 11A:
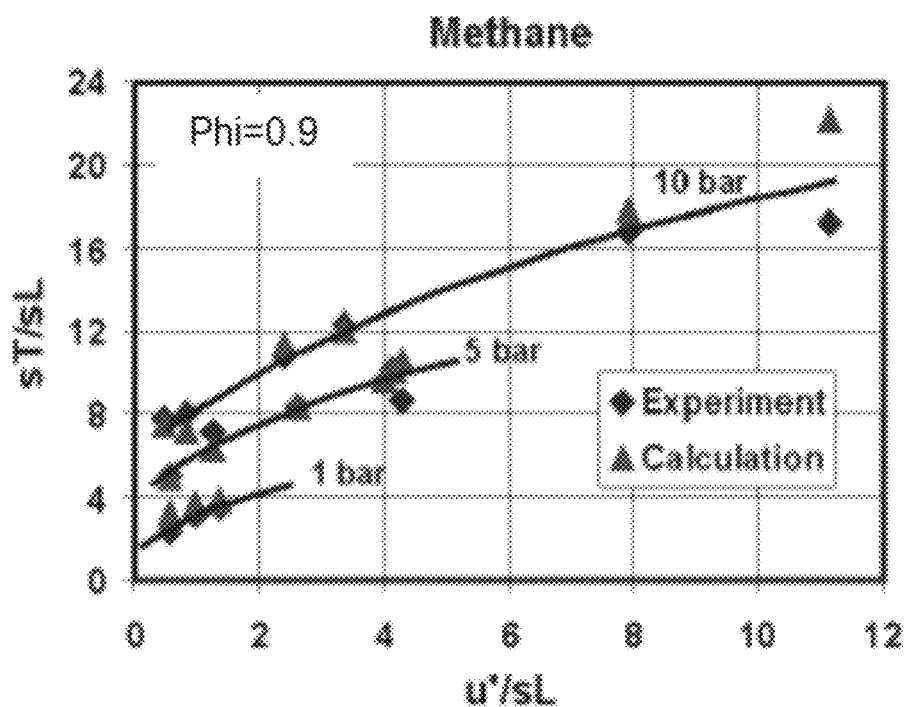
FIGS. 11A and 11B are graphs illustrating a relationship between the turbulent flame speed (ST) and laminar flame speed (SL) at different pressure, turbulent intensity and turbulent Reynolds number according to an embodiment of the present invention.
Figure 11B:
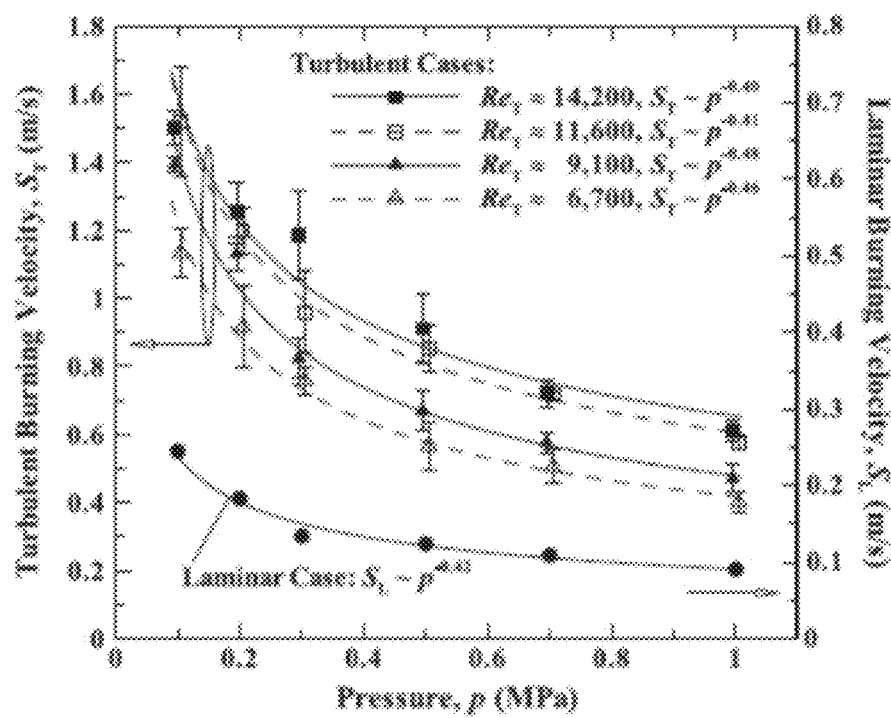

Similarly, the relationship between the turbulent flame speed the laminar flame speed as functions of the pressure and turbulent intensity is shown in FIG. 11A. As shown, the turbulent flame speed increases with increasing pressure and turbulent intensity. The relationship between turbulent flame speed ST and laminar flame speed SL as a function of pressure at different levels of turbulent Reynolds number is shown in FIG. 11B. As shown, turbulent flame speed increases with increasing the turbulent Reynolds number while it decreases with increasing pressure. As shown in FIG. 11B, the turbulent flame speed (ST) is overall about 5-10 times that of the laminar flame speed (SL) with reference to the Reynolds numbers (ReT) for lean methane-air mixtures.

Further, the effective swirl number can be changed according to the wide range of operating conditions of the gas turbine combustor 1200 by controlling the flow speed ratio Uc/U in a narrow range. By varying the inner and outer vane angles according to the desired objective, the coaxial dual swirler nozzle according to the present disclosure may be designed as a high swirl nozzle with a strong recirculation zone or as a low swirl nozzle with diverging flows for stable flame.

Figure 12:
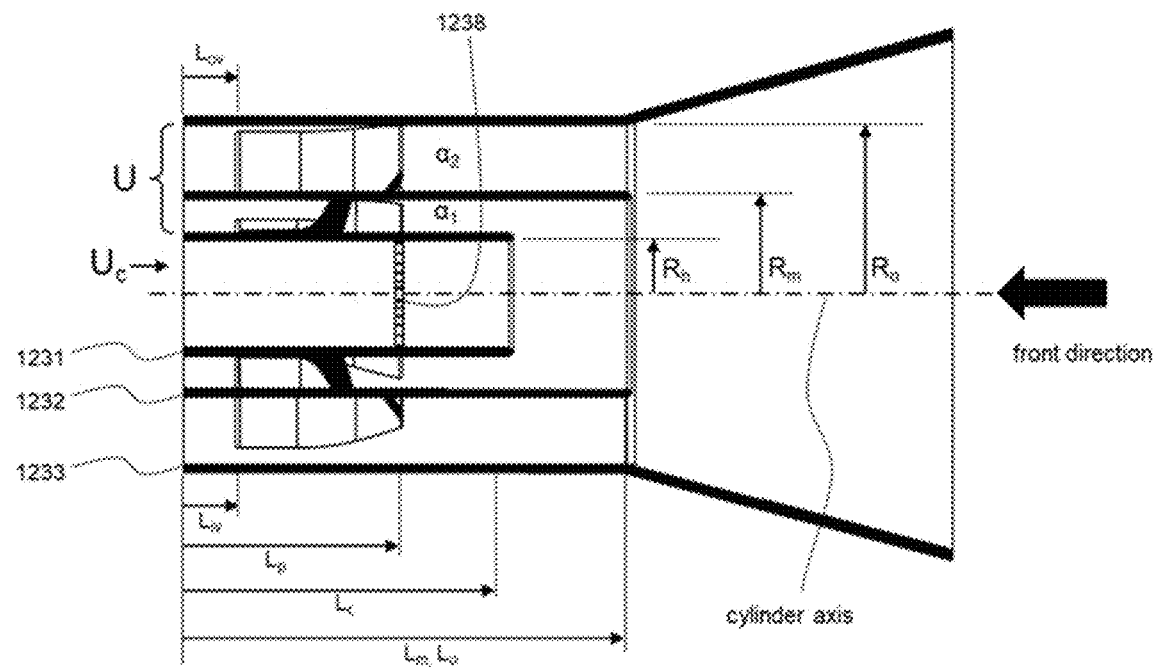
FIG. 12 is a cross-sectional view illustrating a combustion nozzle having a middle cylinder between a center cylinder and an outer cylinder.

FIG. 12 illustrates a cross-sectional view of a combustion nozzle 1230, in which parameters defining a relative position of each component of the combustion nozzle 1230 are shown. The inner vane angle and the outer vane angle are represented by $\alpha 1$ and $\alpha 2$, respectively. Parameters representing the respective positions in FIG. 12 are as follows.

$L_p$ is a parameter indicating a location of perforated plate 1238.

$L_c$ is a parameter indicating a location of a center cylinder tip.

$L_m$ is a parameter indicating a location of a middle cylinder tip.

$L_o$ is a parameter indicating a location of an outer cylinder tip.

$L_{iv}$ is a parameter indicating a location of an inner vane 1235.

$L_{ov}$ is a parameter indicating a location of an outer vane 1236.

A radius of each cylinder, i.e., the inner passage cylinder 1231, the middle cylinder 1232, and the outer cylinder 1233, that determines a size of the cylinder is represented as Rh, Rm, and R0, respectively. Rm representing a size (and thus a position) of the middle cylinder 1232 may be expressed by the following equation (1).

$$Rm = Rh + \beta \times (R0 - Rh) \quad (1)$$

The value of β determines the position or size of the middle cylinder 1232.

A swirl number S representing a degree of swirl may be defined by the following equation (2).

$$S = \frac{\int_{R_h}^{R_m} U_{a_1}^2 \tan(\alpha_1) r^2 dr + \int_{R_m}^{R_o} U_{a_2}^2 \tan(\alpha_2) r^2 dr}{R_o \left[ \int_0^{R_h} U_c^2 r dr + \int_{R_h}^{R_m} U_{a_1}^2 r dr + \int_{R_m}^{R_o} U_{a_2}^2 r dr \right]} \quad (2)$$

$$S = \frac{2}{3} \tan(\alpha_1) \frac{(1-A)\left[(1-\beta)\frac{R_h}{R_o}+\beta\right]^3 - \left(\frac{R_h}{R_o}\right)^3 - A}{C^2\left(\frac{R_h}{R_o}\right)^2 + (1-B)\left[(1-\beta)\left(\frac{R_h}{R_o}\right)+\beta\right]^2 - \left(\frac{R_h}{R_o}\right)^2 + \beta} \quad (2)$$

Where, $A = \frac{\cos^2(\alpha_2)\tan(\alpha_2)}{\cos^2(\alpha_1)\tan(\alpha_1)}$, $B = \frac{\cos^2(\alpha_2)}{\cos^2(\alpha_1)}$, $C = \frac{U_c}{U\cos(\alpha_1)}$ The combustion nozzle 1230 according to an embodiment of the present invention may further include the following design parameters in addition to α1 and α2, and β.

$$Rh/R0: \text{ratio of outer and } hub \text{ radius} \quad (3)$$

$$Uc/U: \text{ratio of } U \text{ and central } Uc \quad (4)$$

Where, R represents an inner diameter of each cylinder as shown in FIG. 12, Uc represents a flow velocity of a fluid passing through the center cylinder 1231, and U represents a flow velocity of a fluid passing through the middle cylinder 1232 and the outer cylinder 1233.

By combining Uc (flow velocity) and Rh (radius of the center cylinder 1231), flow rates through the center cylinder 1231 may be determined. Flow rates passing through the inner vane flow region and the outer vane flow region may also be determined via β and U values.

As described above, the combustion nozzle 1230 causes a fuel flow through the flow passages of the center cylinder 1231, the inner vane flow region, and the outer vane flow regions. The combustion nozzle 1230 according to an embodiment of the present invention may also create various swirling flows by disposing the inner vane 1235 and the outer vane 1236 in the inner vane flow region and the outer vane flow region, separately, to permit independent control.

In the conventional combustion nozzle having the center cylinder 1231 and the outer cylinder 1233, the swirl number may be determined by two separate fuel flow regions partitioned by the center cylinder 1231 and the outer cylinder 1233 along with the fixed vane angles disposed therebetween. However, the combustion nozzle 1230 according to an embodiment of the present invention may determine the swirl number more diversely, which is enabled not only by adjusting fuel flows through the aforementioned fuel flow regions partitioned by the middle cylinder 1232, but also by adjusting the vane angles of the inner vane 1235 (disposed between the center cylinder 1231 and the middle cylinder 1232) and the outer vane 1236 (disposed between the middle cylinder 1232 and the outer cylinder 1233). The swirl number generated by adjusting the partitioned fuel flow regions, the inner vane angle, and the outer vane angle can be defined as an effective swirl number. Also, it is possible to generate counter-swirling or co-swirling by adjusting the direction of the inner and outer vanes. Accordingly, the combustion nozzle 1230 according to an embodiment of the present invention may be able to provide a narrow range of Uc/U to control the effective swirl number for diverging flow to match the flame speed. In other words, the effective swirl number can be changed according to the wide range of operating conditions by controlling Uc/U in a narrow range. Also, by varying inner and outer vane angles according to the design objective, the coaxial dual swirler nozzle can be a high swirl nozzle with a recirculation zone or a low swirl nozzle with diverging flows to achieve a stable flame. The fuel and air mixing can be improved by the shear/mixing layer created by flow streams through the two swirlers 1235 and 1236 at different angles, which can be set for co-rotating (co-swirling) flows or counter-rotating (counter-swirling) flows.

Figure 13:
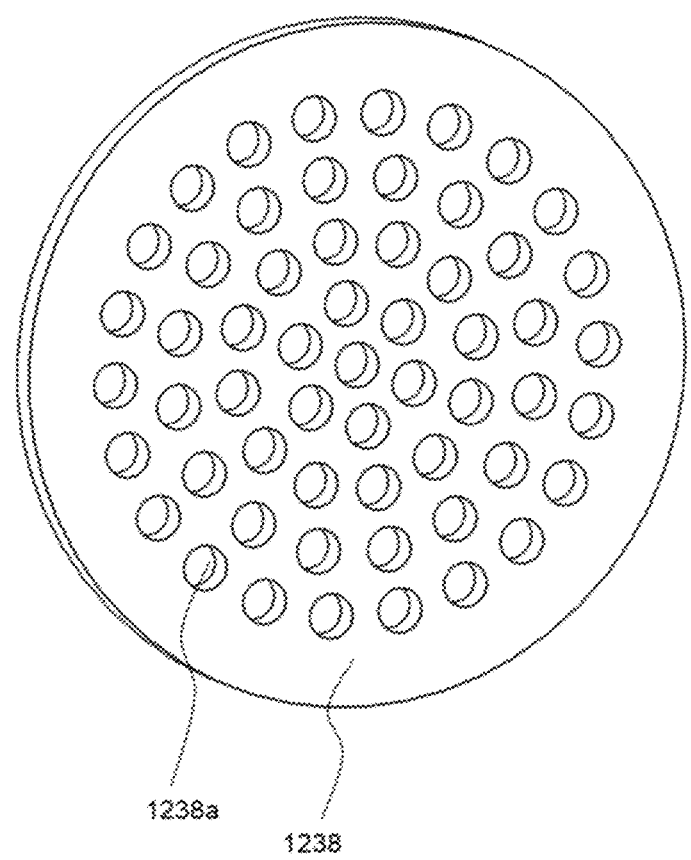
FIG. 13 is a perspective view illustrating a perforated plate of a combustion nozzle according to an embodiment of the present invention.

In addition, a hole area ratio of the perforated plate 1238 may be further considered to determine the effective swirl number. Referring to FIG. 13, the perforated plate 1238 disposed inside the center cylinder 1231 is provided with a plurality of flow holes 1238a on a circular plate to create turbulent flow. A ratio of an area occupied by the flow hole 1238a to an area of the entire plate may be expressed as the hole area ratio (%). The hole area ratio may be maintained in 50-90%, more preferably in 60-80% to accomplish efficient fuel flow through the center cylinder 1231. More preferably, the hole area ratio may be maintained at 70%.

Figure 14:
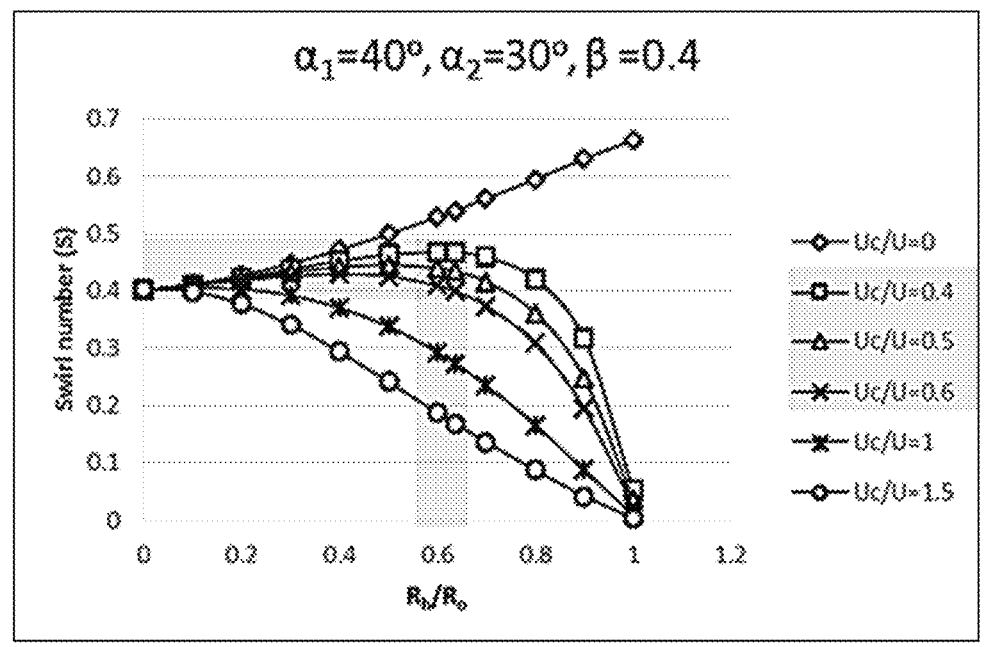
FIGS. 14 and 15 are graphs illustrating an effective swirl number of a combustion nozzle, according to an embodiment of the present invention, having a middle cylinder between a center cylinder and an outer cylinder.
Figure 15:
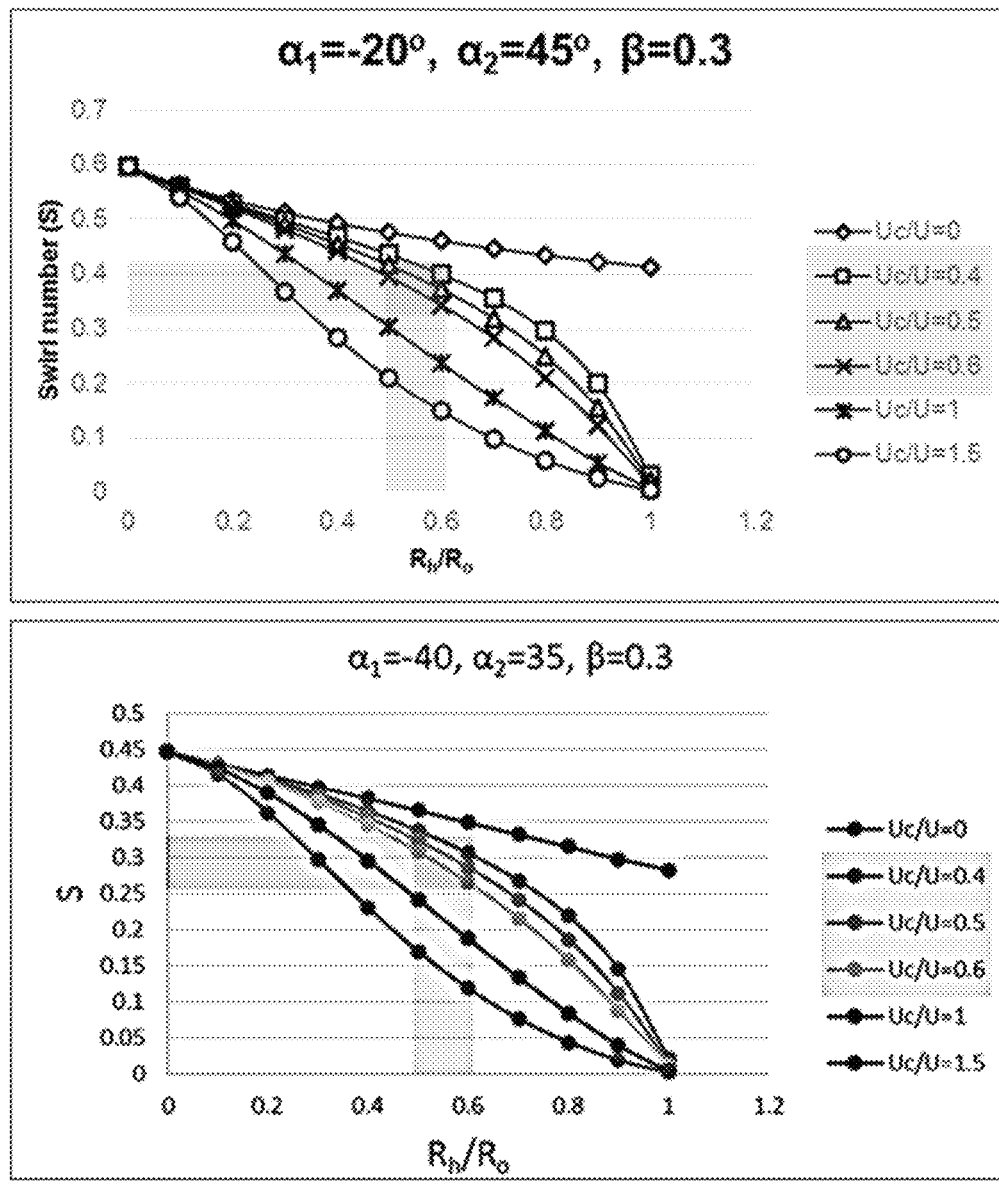

FIGS. 14 and 15 show the swirl number of the combustion nozzle 1230 according to an embodiment of the present invention using the design parameters. Specifically, the results of FIG. 14 show co-swirling with vane angles in the same direction (positive), i.e., α1=40° and α2=30°. Here, β is 0.4, indicating that the middle cylinder 1232 is located at a distance from the center cylinder 1231 by 40% of R0−Rh. The optimal effective swirl number may be in the range of 0.4 to 0.5 when Uc/U is 0.4 to 0.6.

In the other hand, FIG. 15 illustrates the effective swirl number of the counter-swirling having vane angles in different directions, i.e., α1=−20°, α2=45° or α1=−40°, α2=35°. It may be seen that when α1=−20° and α2=45°, the outer vane 1236 causes a larger swirl relative to the inner vane 1235, which allows more efficient control of the swirl number. Here, β is 0.3. The middle cylinder 1232 is located at a distance from a radius of the center cylinder by 30% of R0−Rh.

Although the combustion nozzle has been described in detail above through a few exemplary embodiments, the present disclosure is not limited thereto and should be construed as having the widest range according to the basic spirit disclosed herein. Those skilled in the art may implement a pattern of a form not stated above by combing or replacing the disclosed exemplary embodiments, which should also be construed as within the scope of the present disclosure. Further, it will be apparent to those skilled in the art that various modifications and variation can be easily made to these exemplary embodiments without departing from the spirit or scope of the claims.

What is claimed is:
1. A combustion nozzle of a gas turbine, comprising:
a center cylinder formed by a sidewall of a cylinder shape having a first length in an axial direction, the first length measured from an imaginary plane disposed at an upstream end of the combustion nozzle, the imaginary plane passing perpendicularly through a cylinder axis of the center cylinder, the center cylinder having one end disposed at the imaginary plane;

a middle cylinder coaxially disposed with respect to the center cylinder and formed by a sidewall of a cylinder shape having a second length in the axial direction, the middle cylinder having one end disposed at the imaginary plane and surrounding the center cylinder, the second length measured from the imaginary plane;

an outer cylinder coaxially disposed with respect to the middle cylinder and formed by a sidewall of a cylinder shape having a third length in the axial direction, the outer cylinder having one end disposed at the imaginary plane and surrounding the middle cylinder, the third length measured from the imaginary plane; and a perforated plate disposed inside the center cylinder to create turbulent flow through the center cylinder, the perforated plate including a circular plate having a disc shape that passes through the cylinder axis of the center cylinder and abuts the sidewall of the center cylinder on opposite sides of the cylinder axis of the center cylinder, the perforated plate having a plurality of holes to create the turbulent flow, wherein a ratio of an area of the plurality of holes to an area of the perforated plate has a value of 60% to 80%, wherein the middle cylinder creates two separate flow regions outside the center cylinder, and wherein the second length is greater than the first length.

2. The combustion nozzle of claim 1, further comprising inner vanes disposed between the center cylinder and the middle cylinder and outer vanes disposed between the middle cylinder and the outer cylinder, wherein the inner vanes and the outer vanes have a leading edge.

3. The combustion nozzle of claim 2, wherein a vane angle of the inner vanes and the outer vanes is defined as a degree to which a vane is inclined from the leading edge of the vane with respect to the cylinder axis of the center cylinder, and wherein a product of an angle of the inner vanes and an angle of the outer vanes has a negative value.

4. The combustion nozzle of claim 3, wherein the middle cylinder (Rm) has a cylinder radius defined by $$Rm=Rh+\beta\times(R0-Rh), \text{ and}$$

wherein β has a value from 0.1 to 0.9, Rh is a radius of the center cylinder, and R0 is a radius of the outer cylinder.

5. The combustion nozzle of claim 4, wherein the center cylinder is configured to pass a fluid at a flow velocity Uc, and the middle cylinder and outer cylinder may pass a fluid at a flow velocity U, and wherein the ratio of Uc to U has a value of 0.4 to 0.6.

6. The combustion nozzle of claim 3, further comprising a cone-shaped diverging nozzle tip attached to the outer cylinder to create a diverging flow downstream of the nozzle to improve fuel and air mixing efficiency.

7. The combustion nozzle of claim 3, wherein the the plurality of holes are arranged along a plurality of concentric circles around the cylinder axis of the center cylinder.

8. The combustion nozzle of claim 2, wherein a vane angle of the inner vanes and the outer vanes is defined as a degree to which a vane is inclined from the leading edge of the vane with respect to the cylinder axis of the center cylinder, and wherein a product of an angle of the inner vanes and an angle of the outer vanes has a positive value.

9. The combustion nozzle of claim 8, wherein the middle cylinder (Rm) has a cylinder radius defined by $$Rm=Rh+\beta\times(R0-Rh), \text{ and}$$

wherein β has a value from 0.1 to 0.9, Rh is a radius of the center cylinder, and R0 is a radius of the outer cylinder.

10. The combustion nozzle of claim 9, wherein the center cylinder may pass a fluid at a flow velocity Uc, and the middle cylinder and outer cylinder is configured to pass a fluid at a flow velocity U, and wherein the ratio of Uc to U has a value of 0.4 to 0.6.

11. The combustion nozzle of claim 8, further comprising a cone-shaped diverging nozzle tip attached to the outer cylinder to create a diverging flow downstream of the nozzle to improve fuel and air mixing efficiency.

12. The combustion nozzle of claim 8, wherein the the plurality of holes are arranged along a plurality of concentric circles around the cylinder axis of the center cylinder.

13. A gas turbine, comprising:

a compressor for compressing air received from an external environment;

a combustor for producing combustion gas by mixing the compressed air with fuel and combusting the mixture at a constant pressure, the combustor including a combustion nozzle; and a turbine for generating power by receiving the combustion gas, wherein the combustion nozzle comprises:

a center cylinder formed by a sidewall of a cylinder shape having a first length in an axial direction, the first length measured from an imaginary plane disposed at an upstream end of the combustion nozzle, the imaginary plane passing perpendicularly through a cylinder axis of the center cylinder, the center cylinder having one end disposed at the imaginary plane;

a middle cylinder coaxially disposed with respect to the center cylinder and formed by a sidewall of a cylinder shape having a second length in the axial direction, the middle cylinder having one end disposed at the imaginary plane and surrounding the center cylinder, the second length measured from the imaginary plane;

an outer cylinder coaxially disposed with respect to the middle cylinder and formed by a sidewall of a cylinder shape having a third length in the axial direction, the outer cylinder having one end disposed at the imaginary plane and surrounding the middle cylinder, the third length measured from the imaginary plane; and a perforated plate disposed inside the center cylinder to create turbulent flow through the center cylinder, the perforated plate including a circular plate having a disc shape that passes through the cylinder axis of the center cylinder and abuts the sidewall of the center cylinder on opposite sides of the cylinder axis of the center cylinder, the circular plate having a plurality of holes to create the turbulent flow, wherein a ratio of an area of the plurality of holes to an area of the perforated plate has a value of 60% to 80%, wherein the middle cylinder creates two separate flow regions outside the center cylinder, and wherein the second length is greater than the first length.

14. The gas turbine of claim 13, further comprising inner vanes disposed between the center cylinder and the middle cylinder and outer vanes disposed between the middle cylinder and the outer cylinder, wherein the inner vanes and the outer vanes have a leading edge.

15. The gas turbine of claim 14,
wherein a vane angle of the inner vanes and the outer vanes is defined as a degree to which a vane is inclined from the leading edge of the vane with respect to the cylinder axis of the center cylinder, and
wherein a product of an angle of the inner vanes and an angle of the outer vanes has a negative value.

16. The gas turbine of claim 15,
wherein the middle cylinder (Rm) has a cylinder radius defined by $Rm=Rh+\beta \times (R0-Rh)$, and wherein β has a value from 0.1 to 0.9, Rh is a radius of the center cylinder, and R0 is a radius of the outer cylinder.

17. The gas turbine of claim 16,
wherein the center cylinder may pass a fluid at a flow velocity Uc, and the middle cylinder and outer cylinder is configured to pass a fluid at a flow velocity U, and wherein the ratio of Uc to U has a value of 0.4 to 0.6.

18. The gas turbine of claim 14,
wherein a vane angle of the inner vanes and the outer vanes is defined as a degree to which a vane is inclined from the leading edge of the vane with respect to the cylinder axis of the center cylinder, and
wherein a product of an angle of the inner vanes and an angle of the outer vanes has a positive value.

19. The gas turbine of claim 13, wherein the second length and the third length are equal to each other.

20. The combustion nozzle of claim 1, wherein the second length and the third length are equal to each other.

21. A combustion nozzle of a gas turbine, comprising:
a center cylinder formed by a sidewall of a cylinder shape having a first length in an axial direction, the first length measured from an imaginary plane disposed at an upstream end of the combustion nozzle, the imaginary plane passing perpendicularly through a cylinder axis of the center cylinder, the center cylinder having one end disposed at the imaginary plane;
a middle cylinder coaxially disposed with respect to the center cylinder and formed by a sidewall of a cylinder shape having a second length in the axial direction, the middle cylinder having one end disposed at the imaginary plane and surrounding the center cylinder, the second length measured from the imaginary plane;
an outer cylinder coaxially disposed with respect to the middle cylinder and formed by a sidewall of a cylinder shape having a third length in the axial direction, the outer cylinder having one end disposed at the imaginary plane and surrounding the middle cylinder, the third length measured from the imaginary plane;
a perforated plate disposed inside the center cylinder to create turbulent flow through the center cylinder, the perforated plate including a circular plate having a disc shape that passes through the cylinder axis of the center cylinder and abuts the sidewall of the center cylinder on opposite sides of the cylinder axis of the center cylinder;
inner vanes disposed between the center cylinder and the middle cylinder; and
outer vanes disposed between the middle cylinder and the outer cylinder,
wherein the inner vanes and the outer vanes have a leading edge,
wherein the middle cylinder creates two separate flow regions outside the center cylinder, and
wherein the second length is greater than the first length.

* * * * *